United States Patent

[11] 3,591,802

[72] Inventor Mataichi Tajima
 Ashigara-Kamigun, Kanagawa, Japan
[21] Appl. No. 550,501
[22] Filed May 16, 1966
[45] Patented July 6, 1971
[73] Assignee Fuji Shashin Film Kabushiki Kaisha
 Ashigara-Kamigun, Kanagawa, Japan
[32] Priority May 18, 1965
[33] Japan
[31] 40/28807

[54] METHOD OF MAKING A COLOR RADIOGRAPH, AND A FLUORESCENT SCREEN AND LIGHT SENSITIVE MATERIAL USED THEREFOR
10 Claims, 5 Drawing Figs.
[52] U.S. Cl. .................................................. 250/65, 250/80, 250/86
[51] Int. Cl. .................................................. G03b 41/16, H01j 1/62
[50] Field of Search .................................................. 250/65, 66, 67, 68, 86, 80

[56] References Cited
UNITED STATES PATENTS
2,807,725 9/1957 Schwerin .......................... 250/65
2,434,019 1/1948 Switzer et al. .......................... 250/65

Primary Examiner—James W. Lawrence
Assistant Examiner—A. L. Birch
Attorney—Sughrue, Rothwell, Mion, Zinn & Macpeak ABSTRACT: A fluorescent screen for producing improved color radiographs comprising at least two color filter materials having different spectroscopic characteristics and a fluorescent material associated with the filter material, the filter materials being interposed between the fluorescent material and the film on which the radiograph will be produced.

By passing radiation through an object and impinging the radiation on the fluorescent material, it is caused to fluoresce. The fluorescent material is correlated with the filters so that each filter passes radiation in a separate nonoverlapping portion of the spectrum. The filtered radiation is then passed onto the photographic color film.

PATENTED JUL 6 1971

3,591,802

INVENTOR.
MATAICHI TAJIMA

BY
Sughrue, Rothwell, Mion, Zinn & Macpeak

ATTORNEYS

METHOD OF MAKING A COLOR RADIOGRAPH, AND A FLUORESCENT SCREEN AND LIGHT SENSITIVE MATERIAL USED THEREFOR

This invention relates to a method of making a color radiograph which represents the difference in the permeabilities of radiations through an object as a difference in color or optical density on a photographic film. The invention also relates to a fluorescent screen and light sensitive material used in making color radiographs.

The color radiograph using a color film may theoretically provide two or three times the information provided by black-white photography in medical or industrial uses. Up to this time, a number of efforts have been made as to such false color photography without success. This is because there are many problems or disadvantages in the luminous ratio and spectroscopic distributions of fluorescent intensifying screens used in the process and also because there has been used color film of the same type as is used in the ordinary camera.

The object of the invention is to provide a novel fluorescent intensifying screen and color film to overcome these disadvantages.

Figure 1:
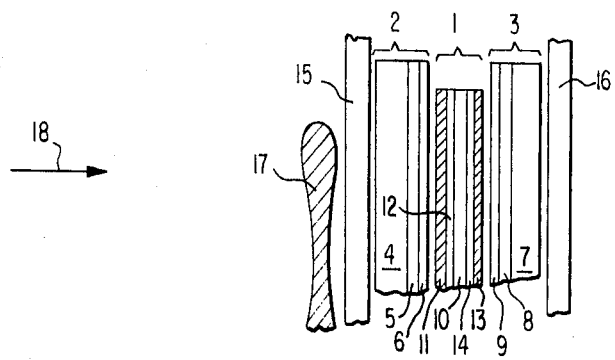
FIG. 1 is a side view of an assembly during radiations by X-rays in one embodiment of the invention.

Referring to FIG. 1, radiation such as X-rays 18, is radiated through an object 17 and onto an assembly consisting of a coupling type color film 1 having sensitive layers on both surfaces. The film 1 is inserted between fluorescent screens 2 and 3, and frames 15 and 16 which press the elements of the assembly.

As to the fluorescent color, strict spectroscopic conditions are not necessarily required for a fluorescent material used, for example, in a cathode-ray tube for color television, since the observation principle is due to additive color principle.

Figure 2:
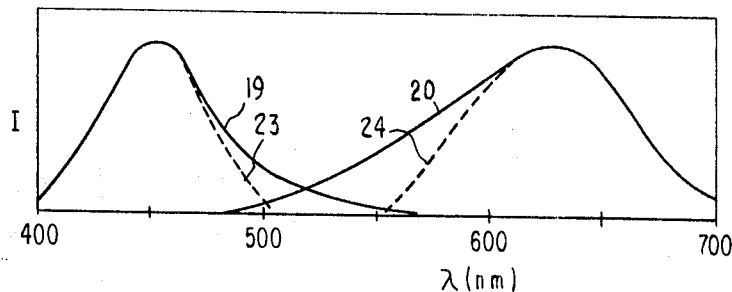
FIG. 2 and FIG. 3 are graphs representative of the specific spectral-luminous distributions of the fluorescent intensifying screens.

In FIG. 2, curve 19 represents a blue fluorescence by a fluorescent material ZnS/Ag under radiation of X-rays and curve 20 a red fluorescence by (ZnBe)SiO$_4$/Mn. A red fluorescence by one of the fluorescent materials used in our invention, Zn$_3$(PO$_4$)$_2$/Mn (not shown) is similar to curve 20.

Figure 3:
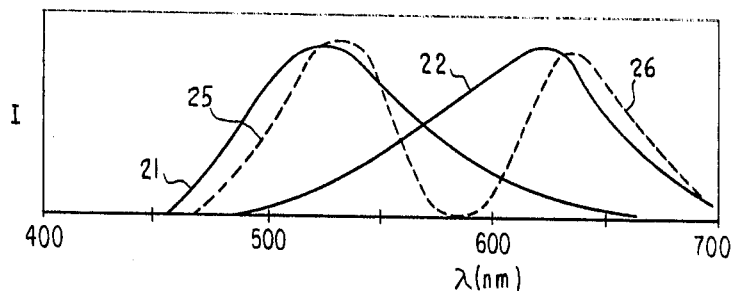

In FIG. 3, different combinations from those in FIG. 2 are employed. Curve 21 represents a green fluorescence by ZnCdS/Ag and curve 22 represents a red fluorescence by (ZnBe)SiO$_4$/Mn.

These fluorescent colors (Curves 19 to 22) shown in FIG. 2 and FIG. 3 cannot be adapted for this invention because the region of their wavelengths is too wide. In this invention, therefore, color filter layers 6 and 9 are provided on the usual fluorescent screens each consisting of a support 4 or 7 coated with a fluorescent material 5 or 8, as shown in FIG. 1.

Curves 19, 20 ad 21, 22 of FIG. 2 and FIG. 3 respectively can be converted into the Curves 23, 24 and 25, 26, respectively, by the so combined fluorescent material and color filter, whereby the color classification of the color radiograph is improved. Furthermore, the strength and weakness in the permeabilities of radiation, such as X-rays, through an object can be represented on a photographic film as differences in color or optical density by controlling the ratio of luminous intensities of the output lights shown by Curves 23 and 24 in FIG. 2 or Curves 25 and 26 FIG. 3, or by controlling the ratio of sensitivities of the photographic light sensitive emulsions 11 and 13 shown in FIG. 1.

Figure 4:
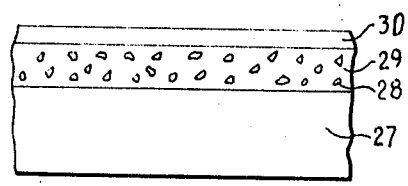
FIG. 4 and FIG. 5 are each schematic cross sections of a fluorescent screen.
Figure 5:
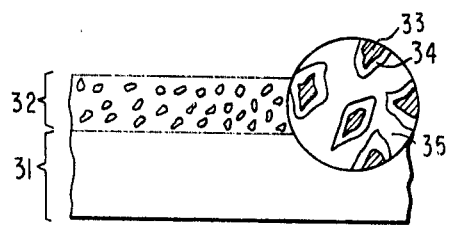

The improvement relating to fluorescent screens as mentioned above may be accomplished by other methods as follows. An example is shown in FIG. 4, wherein a coloring material for filter is added to a binder 29 of a fluorescent material 28 between a support 27 and transparent protective layer 30. Another example is shown in FIG. 5 wherein, in a fluorescent screen consisting of a support 31 and fluorescent material layer 32, each particle 33 of the fluorescent material is enveloped in a color filter material 34. This is shown in FIG. 5 in an enlarged circle. This may be accomplished by the use of a small amount of binder 5 or by pressing or fusing the filter material. A protective film is preferably provided on the fluorescent material layer 32, but it is not necessarily required. In any case, the adhesive property of the support 27 and 31 and fluorescent screens 29 or 32 is so remarkably increased in this improvement that very clear photographic recordings are obtained. In order to raise the clearness of an image, the color filter layer 6 or 9 in FIG. 1 is strengthened in its quality so as to serve as a protective film, resistant to physical and chemical shocks.

In the photographic film 1, consisting of a support having light sensitive emulsions on both surfaces, as shown in FIG. 1, only the emulsion film 11 should be sensitized by the combined light of the fluorescent material 5 excited by the X-rays or other radiation and color filter 6. There does not occur any problem in the combination of fluorescent colors shown in FIG. 2, but in the combination of FIG. 3, emulsion 13 is sensitized too. Similarly, in the combination of the fluorescent colors of FIG. 3, the fluorescence from fluorescent material 8 sensitizes not only the emulsion film 13, but also emulsion film 11 of FIG. 1. In order to overcome this disadvantage, in the method of our invention, optical filter layers 12 and 14 in FIG. 1 are provided as a part of the photographic film 1 as occasion demands.

The color filter material described above is preferably prepared by dissolving a coloring matter in a high molecular material such as gelatin and cellulose acetate.

What I claim is:

1. A method for producing improved color radiographs comprising
    passing radiation through an object,
    impinging the radiation on a first body of fluorescent material causing it to fluoresce,
    impinging the radiation on a second body of fluorescent material causing it to fluoresce,
    passing the fluorescent radiation from the first and second fluorescent materials through separate color filter materials having different areas of spectral absorbtivity which have been correlated with the individual fluorescent materials to narrow the wavelength of the fluorescent radiation from the fluorescent materials so that the filtered fluorescent radiations from each fluorescent material have no area of spectral overlapping, and thus
    impinging said fluorescent radiation from the fluorescent materials, after passing through said filter materials, onto a color photographic film having at least two emulsions thereon, each of said emulsions being exposed substantially completely by only one of said fluorescent radiations, and being substantially inactive with respect of the other fluorescent radiation, whereby a difference in radiation transmissivity of the object will be represented by a variation in color.

2. The method of claim 1 wherein said color filter materials are coated on the surface of said first body of fluorescent material and said second body of fluorescent material, said color filter materials being on the side of said fluorescent bodies adjacent the emulsions of said film.

3. The method of claim 2 wherein said bodies of fluorescent material contain different fluorescent materials and are positioned on both sides of said film, each of said sides of said film containing one of said at least two emulsions thereon.

4. The method of claim 1 wherein said fluorescent material comprises a layer containing discrete particles of fluorescent material and said color filter material is coated on the surfaces of the particles.

5. The method of claim 1 wherein said fluorescent material comprises a layer comprising discrete particles of fluorescent material dispersed in a binder and said color filter material is incorporated in said binder.

6. The method of claim 1 which further comprises, after exposing said individual emulsions, filtering the fluorescent radiation which exposes said emulsions so as to substantially completely prohibit radiation from striking a second photographic emulsion which will expose said second photographic emulsion, said filtering being accomplished by providing further color filter layers in conjunction with said individual emulsion layers, said further color filter layers and said emulsion layers being correlated so that said fluorescent radiation originating from said fluorescent materials strikes said emulsion layer which said fluorescent radiation exposes prior to striking said further filter layer.

7. A fluorescent screen assembly with at least two spaced, facing support members for producing an improved color radiograph comprising at least two color filter materials having different spectroscopic characteristics, said color filter materials facing and spaced from each other, at least one of said color filter materials being on a separate support member from other filter materials, and at least two different fluorescent materials, said individual filter materials being correlated with said individual fluorescent materials on separate support members so that each filter-fluorescent material combination passes radiation in a nonoverlapping portion of the spectrum with respect to the other filter-flourescent material combinations, said color filter materials being interposed between said fluorescent materials and the film on which said radiograph is to be produced, said film being inserted between said spaced, facing support members.

8. A fluorescent screen assembly as in claim 7 wherein said film comprises at least two emulsion layers and at least two color filter layers, said individual emulsion layers first being contacted with radiation which exposes said emulsion layers prior to said filter layers being contacted with said radiation.

9. A fluorescent screen for producing an improved color radiograph comprising a layer containing particles of fluorescent material enveloped in coating of at least two different color filter materials, said individual filter materials being correlated with said fluorescent material so that each filter-fluorescent material combination passes radiation in a different nonoverlapping portion of the spectrum.

10. A fluorescent screen as described in claim 9 wherein said color filter materials are in a binder enveloping said particles.